United States Patent
Kacik et al.

(10) Patent No.: US 8,240,326 B2
(45) Date of Patent: Aug. 14, 2012

(54) FAUCET WITH ASSEMBLY AND RETENTION FEATURES

(75) Inventors: Mark S. Kacik, Lakewood, OH (US); Sanjeev S. Moghe, Chagrin Falls, OH (US); Dale A. Pulver, University Heights, OH (US)

(73) Assignee: Moen Incorporated, North Olmsted, OH (US)

( * ) Notice: Subject to any disclaimer, the term of this patent is extended or adjusted under 35 U.S.C. 154(b) by 567 days.

(21) Appl. No.: 12/495,808

(22) Filed: Jun. 30, 2009

(65) Prior Publication Data

US 2010/0326553 A1 Dec. 30, 2010

(51) Int. Cl.
*F16K 21/00* (2006.01)

(52) U.S. Cl. ............... 137/315.12; 137/625.4; 137/801

(58) Field of Classification Search ............. 137/315.12, 137/315.13, 454.2, 454.5, 454.6, 625.4, 625.17, 137/801, 15.18
See application file for complete search history.

(56) References Cited

U.S. PATENT DOCUMENTS

| | | | |
|---|---|---|---|
| 4,815,703 A | 3/1989 | Antoniello | |
| 4,848,395 A | 7/1989 | Krippendorf | |
| 5,472,010 A * | 12/1995 | Gonzalez | 137/454.6 |
| 5,558,128 A | 9/1996 | Pawelzik et al. | |
| 5,630,628 A | 5/1997 | Monch | |
| 5,660,203 A | 8/1997 | Gnauert et al. | |
| 5,685,341 A | 11/1997 | Chrysler et al. | |
| 5,979,489 A | 11/1999 | Pitsch | |
| 6,073,972 A | 6/2000 | Rivera | |
| 6,202,686 B1 | 3/2001 | Pitsch et al. | |
| 6,289,531 B1 | 9/2001 | Kahle et al. | |
| 6,301,728 B1 | 10/2001 | Pilatowicz et al. | |
| 6,328,059 B1 | 12/2001 | Testori et al. | |
| 6,434,765 B1 | 8/2002 | Burns et al. | |
| 6,438,771 B1 | 8/2002 | Donath, Jr. et al. | |
| 6,757,921 B2 | 7/2004 | Esche | |
| 6,786,240 B2 | 9/2004 | Ouyoung | |
| 6,868,564 B2 | 3/2005 | Ginter et al. | |
| 6,912,742 B1 | 7/2005 | Wang | |
| 7,011,106 B2 | 3/2006 | Kawolics et al. | |
| 7,269,864 B2 | 9/2007 | Brown et al. | |
| 7,334,599 B2 | 2/2008 | Shieh | |
| 7,406,980 B2 | 8/2008 | Pinette | |
| 7,819,137 B2 * | 10/2010 | Nelson et al. | 137/625.4 |
| 7,896,025 B2 * | 3/2011 | Hanson | 137/625.4 |
| 2004/0050422 A1 | 3/2004 | Hsu | |
| 2006/0289343 A1 | 12/2006 | Schmitt et al. | |

* cited by examiner

*Primary Examiner* — Kevin Lee

(74) *Attorney, Agent, or Firm* — Calfee, Halter & Griswold LLP

(57) ABSTRACT

The present invention provides a faucet including structure to ensure components of the faucet are properly and securely assembled together. In one embodiment, the faucet includes a valve body, a mounting tube, and a hose retainer. The valve body is operable to receive at least a portion of a cartridge assembly and to connect to at least two hoses. The mounting tube is operable to mount the faucet to a surface, to receive at least a portion of the valve body, and to connect to at least two hoses. The hose retainer is operable to interface between the valve body and the mounting tube and to connect to at least two hoses. The valve body, the mounting tube, the hose retainer, and the hoses include structure to ensure that the valve body, the mounting tube, the hose retainer, and the hoses are properly and securely assembled together.

20 Claims, 8 Drawing Sheets

FIG. 3F  FIG. 3G

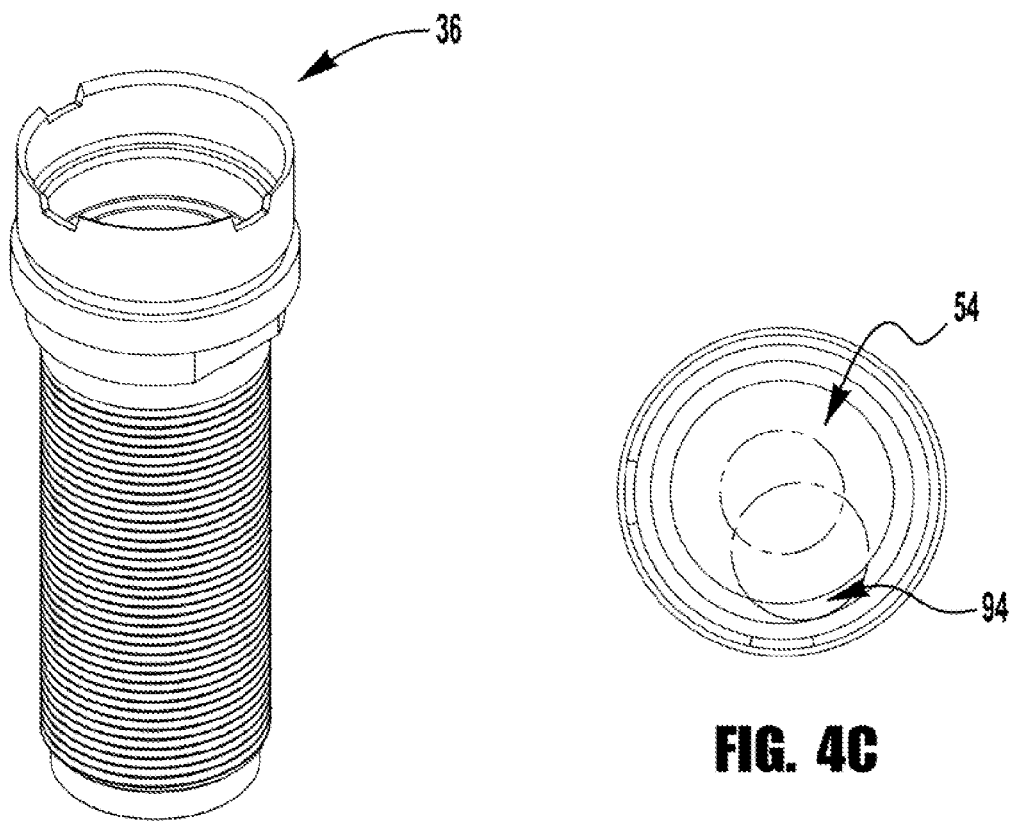
FIG. 4A
FIG. 4C
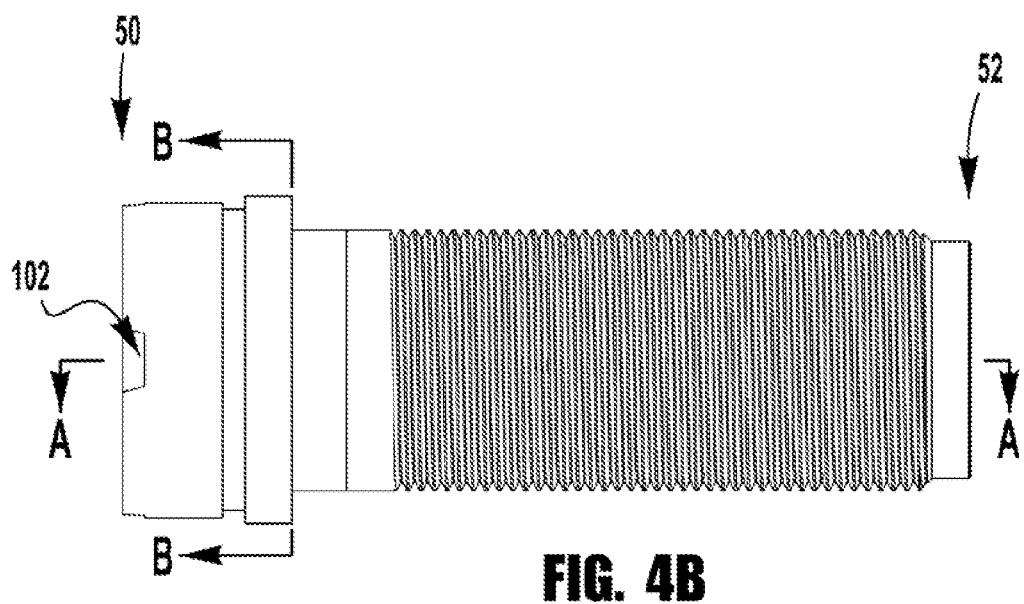
FIG. 4B

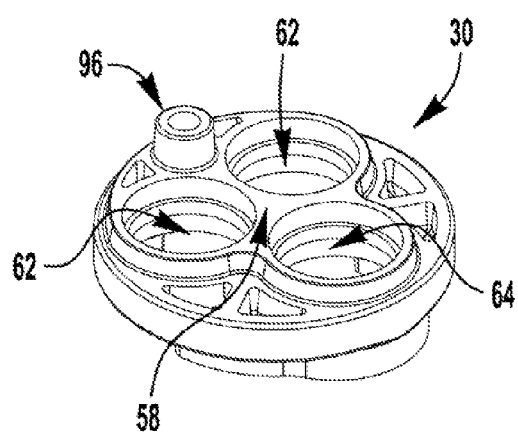
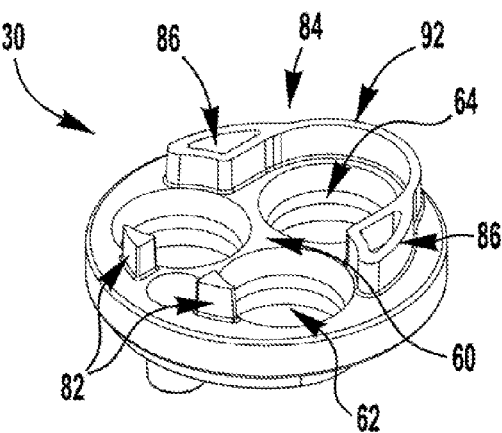
FIG. 5A  FIG. 5B
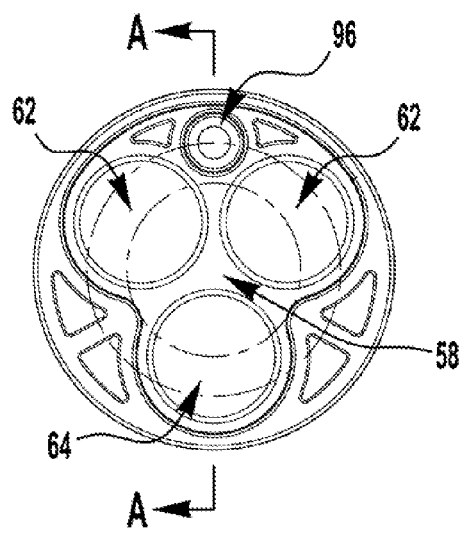
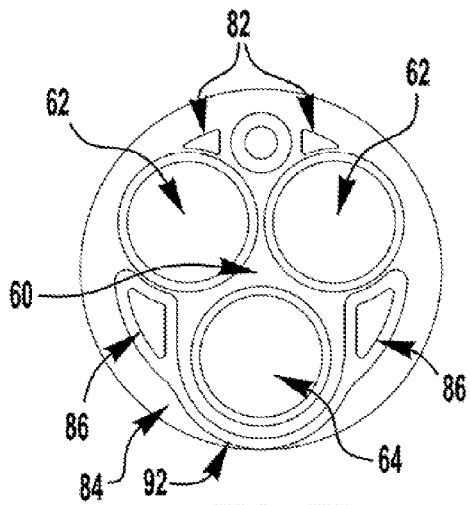
FIG. 5C
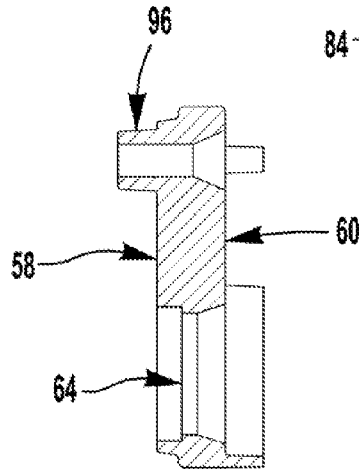
FIG. 5E
FIG. 5D

FAUCET WITH ASSEMBLY AND RETENTION FEATURES

FIELD

The present invention relates generally to a faucet and, more particularly, to a faucet including structure to ensure components of the faucet are properly and securely assembled together.

BACKGROUND

Faucets include many components that need to be assembled together. If these components are not properly and securely assembled together, the faucet may not properly operate. Faucets include many mechanisms to assist in the assembly. Despite these mechanisms, some faucets are still difficult to assemble.

SUMMARY

The present invention provides a faucet including structure to ensure components of the faucet are properly and securely assembled together.

In one embodiment, the faucet includes a valve body, a mounting tube, and a hose retainer. The valve body is operable to receive at least a portion of a cartridge assembly and to connect to at least two hoses. The valve body has a first end and a second end. The first end includes an opening and the second end includes at least two hose openings. The mounting tube is operable to mount the faucet to a surface, to receive at least a portion of the valve body, and to connect to at least two hoses. The mounting tube has a first end and a second end. The mounting tube includes an opening extending from the first end through the second end. The hose retainer is operable to interface between the valve body and the mounting tube and to connect to at least two hoses. The hose retainer has a first side and a second side. The hose retainer includes at least two openings extending therethrough from the first side to the second side. The valve body, the mounting tube, the hose retainer, and the hoses include structure to ensure that the valve body, the mounting tube, the hose retainer, and the hoses are properly assembled together.

In another embodiment, the faucet includes a valve body and a mounting tube. The valve body is operable to receive at least a portion of a cartridge assembly and to connect to at least two hoses. The valve body has a first end and a second end. The first end includes an opening and the second end includes at least two hose openings. The valve body is primarily non-metal. The mounting tube is operable to mount the faucet to a surface, to receive at least a portion of the valve body, and to connect to at least two hoses. The mounting tube has a first end and a second end. The mounting tube includes an opening extending from the first end through the second end. The mounting tube is primarily metal. The valve body includes a circumferential groove near the second end of the valve body. The mounting tube includes a circumferential groove near the first end of the mounting tube. The mounting tube groove is formed by inserting the second end of the valve body into the opening in the first end of the mounting tube and deforming a portion of the mounting tube outwardly adjacent to the valve body groove into the valve body groove. The valve body groove and the mounting tube groove ensure that the valve body and the mounting tube are securely assembled together.

BRIEF DESCRIPTION OF THE DRAWINGS

-FIG. 2A is a side cross-sectional view, and FIG. 2B is a rear cross-sectional view;

FIGS. 3A-3H are views of one embodiment of a valve body for use in the faucet of FIG. 1-FIG. 3A is a perspective view, FIGS. 3B and 3C are side elevational views, FIG. 3D is a top plan view, FIG. 3E is a bottom plan view; and FIGS. 3F, 3G, and 3H are cross-sectional views along the lines A-A, B-B, and C-C in FIGS. 3B, 3C, and 3E, respectively;

FIGS. 4A-4E are views of one embodiment of a mounting tube for use in the faucet of FIG. 1-FIG. 4A is a perspective view, FIG. 4B is a side elevational view, FIG. 4C is a top plan view, and FIGS. 4D and 4E are cross-sectional views along the lines A-A and B-B in FIG. 4B, respectively;

FIGS. 5A-5E are views of one embodiment of a hose retainer for use in the faucet of FIG. 1 -FIG. 5A is a top perspective view, FIG. 5B is a bottom perspective view, FIG. 5C is a top plan view, FIG. 5D is a bottom plan view, and FIG. 5E is a cross-sectional view along the line A-A in FIG. 5C; -FIG. 6A is a cross-sectional view showing an interface between the valve body, the mounting tube, and the hose retainer, and FIG. 6B is a cross-sectional view showing a more detailed interface between the valve body and the mounting tube.

DETAILED DESCRIPTION

Figure 1:
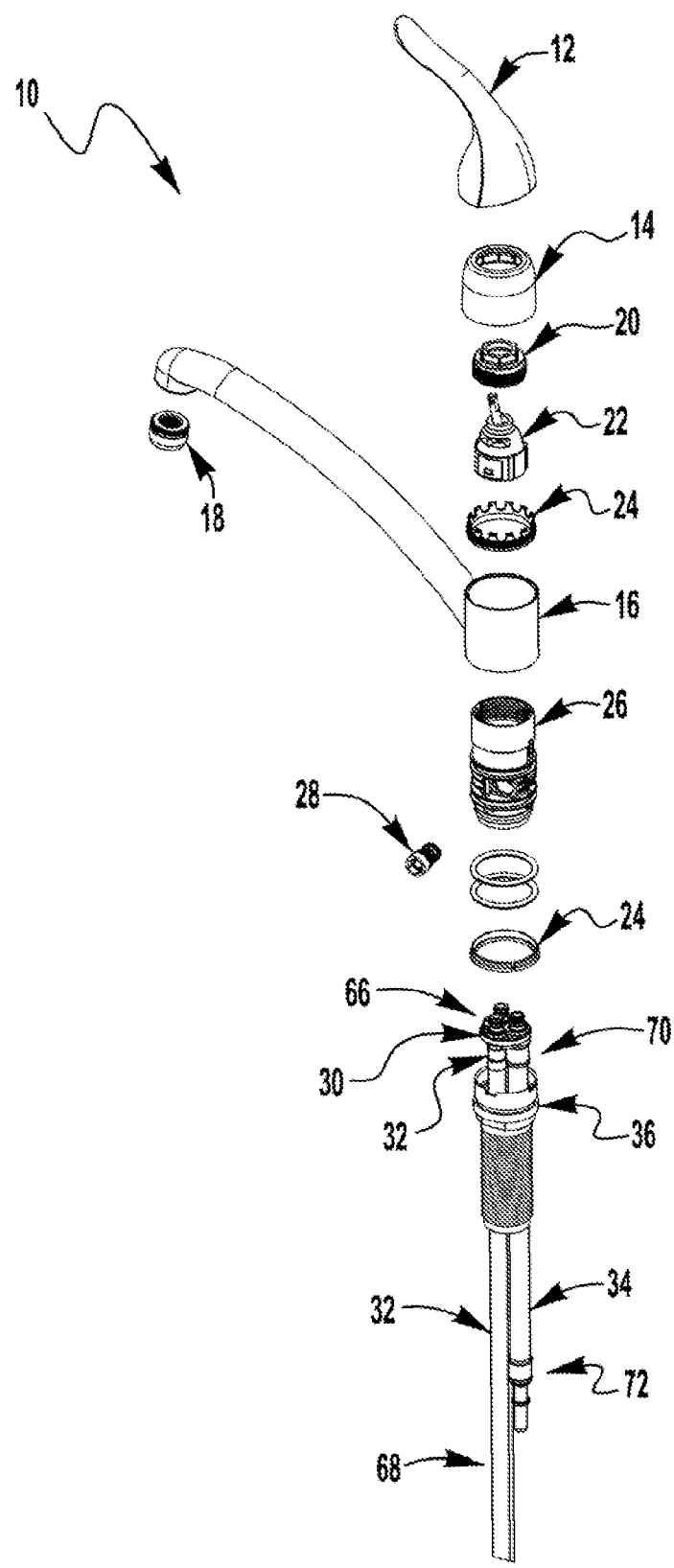
FIG. 1 is an exploded perspective view of a faucet according to one embodiment of the present invention.
Figure 2A:
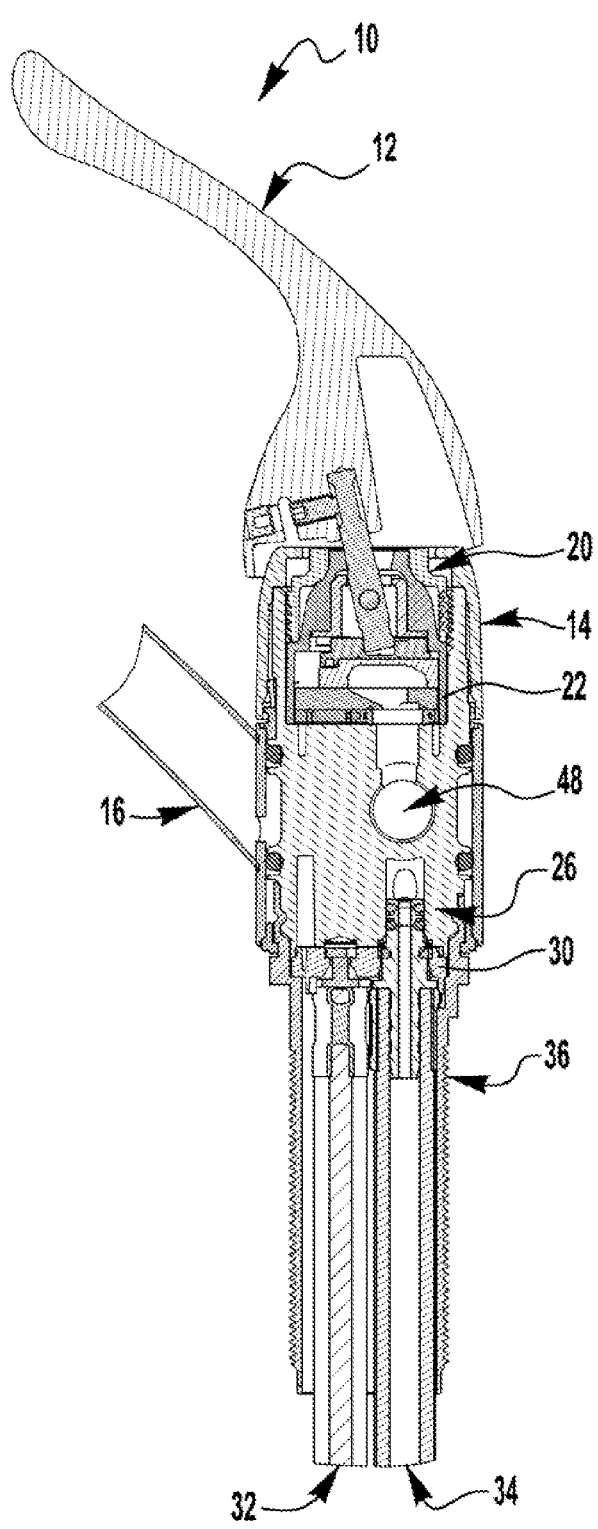
FIGS. 2A-2B are views of the assembled faucet of FIG. 1
Figure 2B:
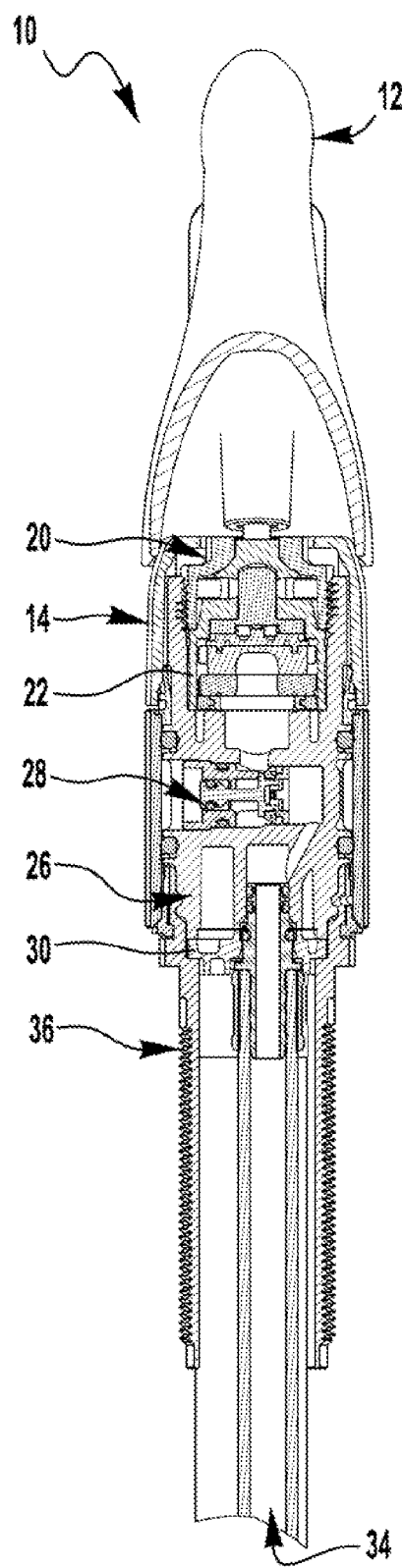
Figure 3A:
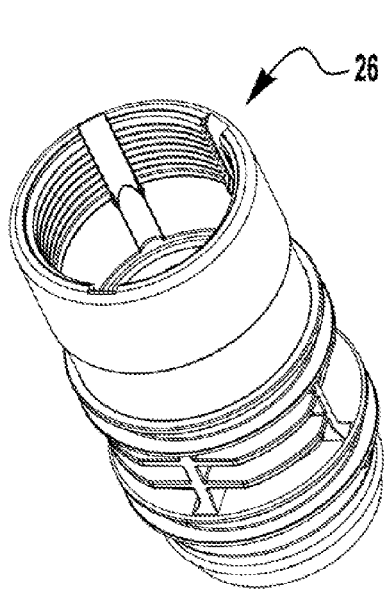
Figure 3D:
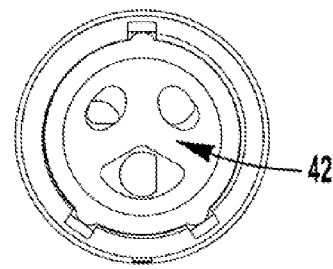
Figure 3E:
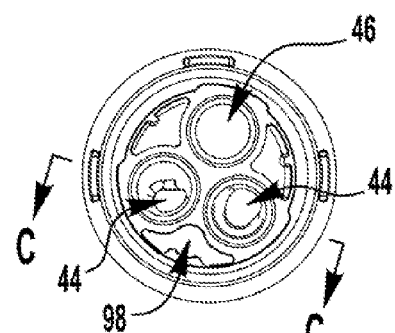
Figure 3B:
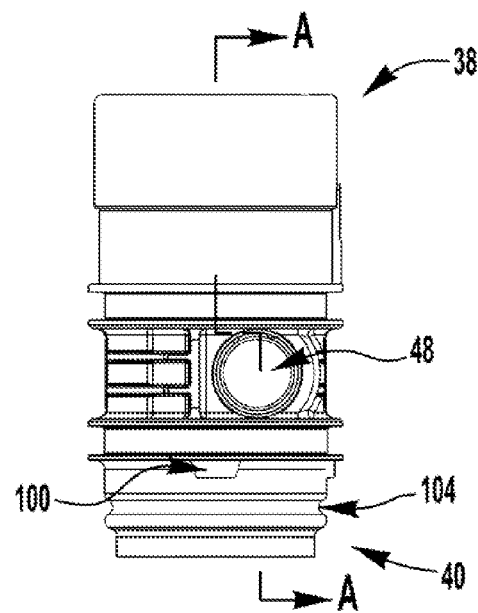
Figure 3C:
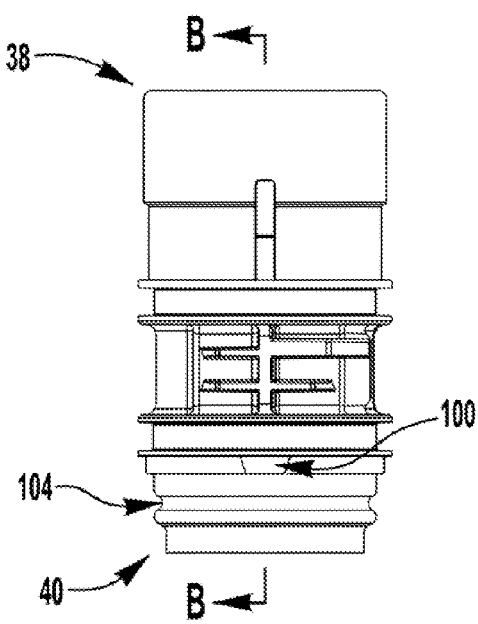
Figure 3H:
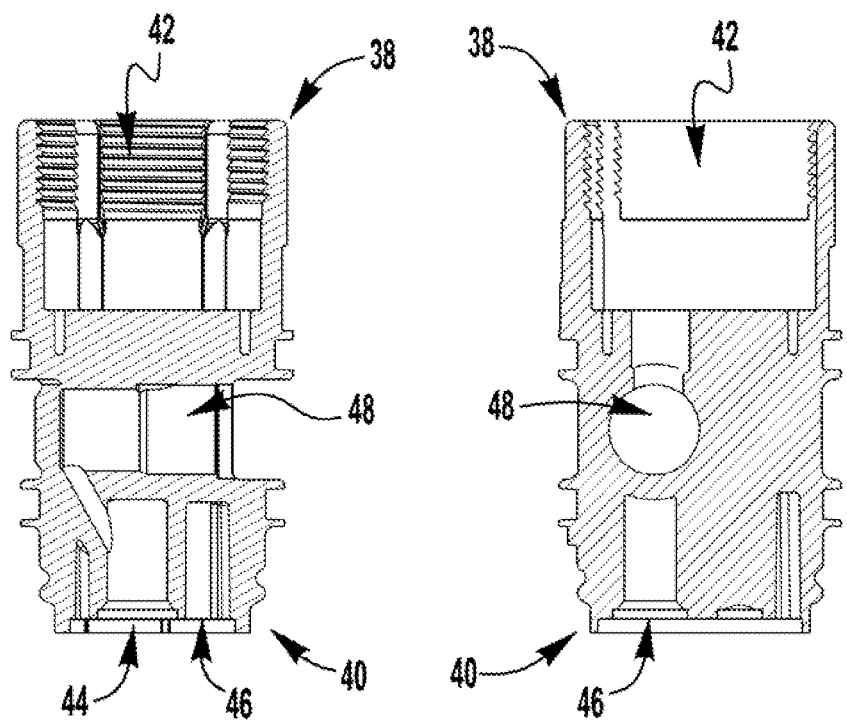
Figure 3H:
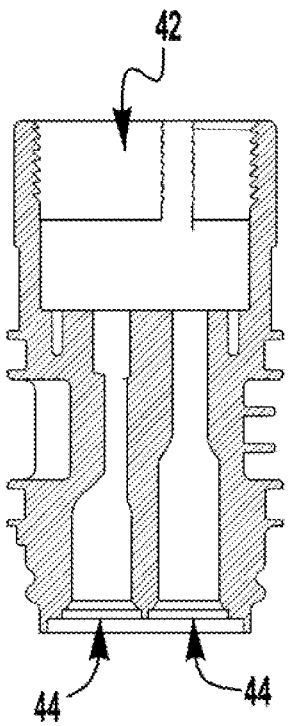
Figure 4E:
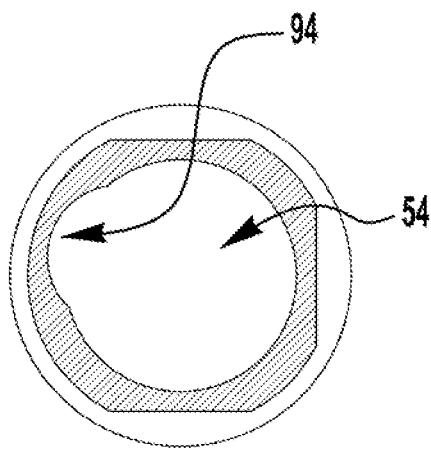
Figure 4D:
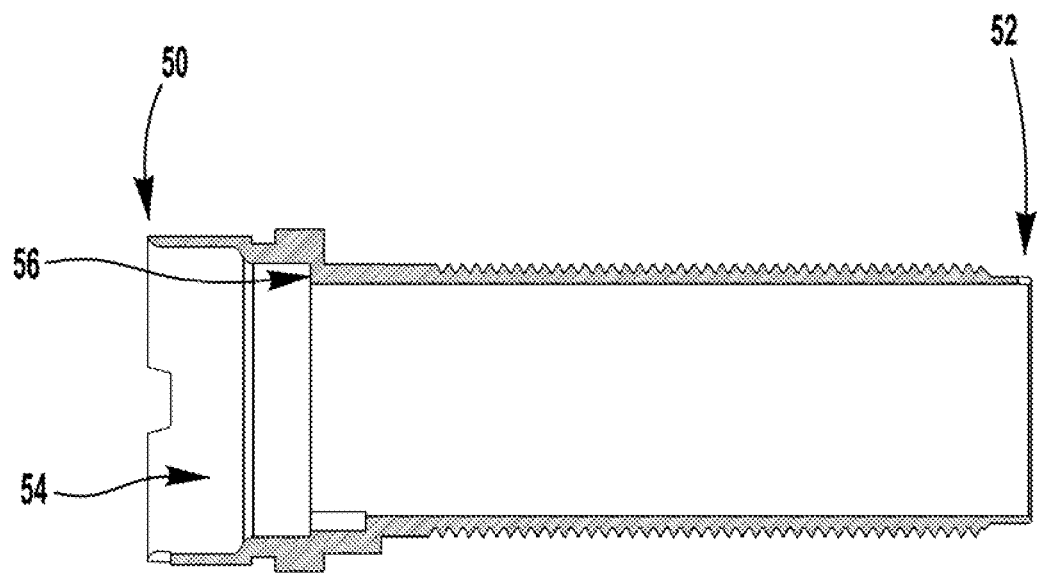

The present invention provides a faucet including structure to ensure components of the faucet are properly and securely assembled together. One embodiment of a faucet 10 of the present invention is shown in FIGS. 1 and 2A-2B. The components of the faucet 10 visible to the user include a handle 12, a dome 14, a spout 16, and an aerator 18. The components of the faucet 10 not visible to the user include a cartridge nut 20, a cartridge assembly 22, bearings 24, a valve body 26, a diverter assembly 28, a hose retainer 30, supply hoses 32, an outlet hose 34, and a mounting tube 36. The structure and operation of these components will be described in greater detail below.

The spout 16 includes a waterway for delivering water from the faucet 10. The handle 12 is used to control the temperature and flow of the water being delivered from the spout 16. In the embodiment shown in FIGS. 1 and 2A-2B, the faucet 10 includes a single handle 12 that controls the temperature and flow of the water. In another embodiment, the faucet 10 includes two handles. In the two-handle embodiment, one handle controls the flow of hot water and the other handle controls the flow of cold water. The dome 14 provides an interface between the handle 12 and the spout 16.

The cartridge assembly 22 is connected to the handle 12. The cartridge assembly 22 controls the temperature and flow of the water being delivered from the spout 16 based on movement of the handle 12 by a user. In the embodiment shown in FIGS. 1 and 2A-2B, the cartridge assembly 22 is a ceramic disk cartridge assembly. However, one of ordinary skill in the art will appreciate that other cartridge assemblies could be used in the faucet 10. Exemplary cartridge assemblies that are manufactured and sold by Moen Incorporated of North Olmsted, Ohio include the 1255 Duralast cartridge and the 1225 cartridge. Cartridge assemblies are well-known in the art and, therefore, the cartridge assembly 22 will not be described in greater detail.

The valve body 26 receives at least a portion of the cartridge assembly 22. The valve body 26 is shown in detail in FIGS. 3A-3H. The valve body 26 is generally cylindrical shaped. The valve body 26 is non-metal or primarily non-metal. In one embodiment, the valve body 26 is a plastic. Exemplary plastics include polysulfones, polyphenylsulfones, and their blends. In one embodiment, the valve body 26 is a glass filled polysulfone. Other exemplary non-metal materials include composite materials (such as epoxies and resins). The valve body 26 has a first end 38 and a second end 40. The first end 38 of the valve body 26 includes an opening 42 for receiving the cartridge assembly 22. The second end 40 of the valve body 26 includes hose openings for connecting to the supply hoses 32 and the outlet hose 34. The second end 40 includes one hose opening for each hose to be connected. In the embodiment shown in FIGS. 1 and 2A-2B, there are two supply hoses 32 (one supply hose for hot water and one supply hose for cold water) and one outlet hose 34 (for a side spray). Therefore, the second end 40 of the valve body 26 includes three hose openings—two supply hose openings 44 and one outlet hose opening 46. The valve body 26 also includes a diverter opening 48 between the first end 38 and the second end 40. The diverter opening 48 receives the diverter assembly 28. The diverter assembly 28 diverts water to the side spray. Faucets without a side spray do not need the outlet hose 34, the outlet hose opening 46, the diverter assembly 28, or the diverter opening 48.

The mounting tube 36 receives at least a portion of the valve body 26. The mounting tube 36 is shown in detail in FIGS. 4A-4E. The mounting tube 36 is generally cylindrical shaped. The mounting tube 36 is metal or primarily metal. In one embodiment, the mounting tube is aluminum. The mounting tube 36 has a first end 50 and a second end 52. An opening 54 extends through the mounting tube 36 from the first end 50 to the second end 52. In one embodiment, a diameter of the opening 54 in the first end 50 is larger than a diameter of the opening 54 in the second end 52. A shoulder 56 is formed near the first end 50 where the diameter of the opening 54 increases. The supply hoses 32 and the outlet hose 34 extend through the second end 52 of the mounting tube 36 to the second end 40 of the valve body 26 when the valve body 26 is received within the opening 54 in the first end 50 of the mounting tube 36.

The hose retainer 30 provides an interface between the valve body 26 and the mounting tube 36. The hose retainer is shown in detail in FIGS. 5A-5E. The hose retainer 30 is generally disc shaped. The hose retainer 30 is non-metal or primarily non-metal. In one embodiment, the hose retainer 30 is plastic. Other exemplary non-metal materials include composite materials (such as epoxies and resins). The hose retainer 30 has a first side 58 and a second side 60. The hose retainer 30 includes hose openings for connecting to the supply hoses 32 and the outlet hose 34. The hose openings extend through the hose retainer 30 from the first side 58 to the second side 60. The hose retainer 30 includes one hose opening for each hose to be connected. In the embodiment shown in FIGS. 1 and 2A-2B, there are two supply hoses 32 and one outlet hose 34. Therefore, the hose retainer 30 includes three hose openings—two supply hose openings 62 and one outlet hose opening 64.

The supply hoses 32 each include a first end 66 and a second end 68, and the outlet hose 34 includes a first end 70 and a second end 72. In the embodiment shown in FIGS. 1, 2A-2B, and 6A, the supply hoses 32 and the outlet hose 34 are flexible hoses. However, one of ordinary skill in the art will appreciate that other types of hoses could be used in the faucet 10. Other exemplary hoses include semi-rigid hoses (such as PEX hoses) and rigid hoses (such as copper tubes). Additionally, the supply hoses 32 each include a connector 74 on the first end 66 and a connector (not numbered) on the second end 68, and the outlet hose 34 includes a connector 76 on the first end 70 and a connector (not numbered) on the second end 72. In the embodiment shown in FIGS. 1, 2A-2B, and 6A, the connectors 74 on the first end 66 of the supply hoses 32 and the connector 76 on the first end 70 of the outlet hose 34 are quick-connect connectors. Each quick-connect connector includes a groove 78 with a retainer clip 80 disposed in the groove 78. Once a hose has been inserted through a hose opening in the hose retainer 30, the retainer clip 80 maintains the hose in the hose opening.

One feature of the faucet 10 ensures that the valve body 26, the hose retainer 30, the supply hoses 32, the outlet hose 34, and the mounting tube 36 are properly assembled together. These components each include structure to ensure the proper assembly. The structure on each component will be described in greater detail below.

The hose retainer 30, the supply hoses 32, and the outlet hose 34 include interfacing structure that ensures the supply hoses 32 and the outlet hose 34 are inserted into the proper hose openings in the hose retainer 30. In one embodiment, the hose retainer 30 includes structure around the supply hose openings 62 and the outlet hose opening 64 and the supply hoses 32 and the outlet hose 34 include structure around the quick-connect connectors 74, 76 that ensure at least one of the hoses can only be inserted into the corresponding hose opening. In the embodiment shown in FIGS. 5A-5E, the structure on the hose retainer 30 includes two smaller generally triangular shaped projections 82 on the second side 60 of the hose retainer 30 around the supply hose openings 62. The structure on the hose retainer 30 also includes a generally U-shaped projection 84 that includes two larger generally triangular shaped projections 86 at ends of the generally U-shaped projection 84 on the second side 60 of the hose retainer 30 around the outlet hose opening 64. The combination of projections on the hose retainer 30 causes an area around the outlet hose opening 64 on the second side 60 of the hose retainer 30 to be larger than an area around the supply hose openings 62 on the second side 60 of the hose retainer 30. In the embodiment shown in FIG. 6A, the structure on the supply hoses 32 includes a flange 88 around the quick-connect connector 74 and the structure on the outlet hose 34 includes a flange 90 around the quick-connect connector 76. The flange 90 around the quick-connect connector 76 on the outlet hose 34 is larger than the flanges 88 around the quick-connect connectors 74 on the supply hoses 32. Since the area around the outlet hose opening 64 is larger than the area around the supply hose openings 62 and the outlet hose quick-connect connector flange 90 is larger than the supply hose quick-connect connector flanges 88, the outlet hose 34 can be inserted into the outlet hose opening 64, but the outlet hose 34 cannot be inserted into the supply hose openings 62.

Additionally, the hose retainer 30 and the mounting tube 36 include interfacing structure that ensures the hose retainer 30 is properly oriented in the mounting tube 36. In one embodiment, the hose retainer 30 includes structure on the second side 60 and the mounting tube 36 includes structure inside the opening 54 in the first end 50 that ensure the hose retainer 30 is flushly assembled inside the mounting tube 36 in the proper orientation. In the embodiment shown in FIGS. 5A-5E, the structure on the hose retainer 30 includes a central portion 92 of the U-shaped projection 84 on the second side 60 of the hose retainer 30. In the embodiment shown in FIGS. 4A-4E, the structure in the mounting tube 36 includes an arc-shaped recess 94 in the shoulder 56 inside the opening 54 in the first end 50 of the mounting tube 36. The hose retainer 30 can only be flushly assembled against the shoulder 56 inside the mounting tube 36 when the central portion 92 of the projection 84 on the hose retainer 30 is inserted into the recess 94 inside the mounting tube 36.

Similarly, the hose retainer 30 and the valve body 26 include interfacing structure that ensures the hose retainer 30 is properly oriented relative to the valve body 26. In one embodiment, the hose retainer 30 includes structure on the first side 58 and the valve body 26 includes structure in the second end 40 that ensure the hose retainer 30 is flushly assembled against the valve body 26 in the proper orientation. In the embodiment shown in FIGS. 5A-5E, the structure on the hose retainer 30 includes a circular projection 96 on the first side 58 of the hose retainer 30 between the supply hose openings 62. In the embodiment shown in FIGS. 3A-3H, the structure in the valve body 26 includes a generally circular opening 98 in the second end 40 of the valve body 26 between the supply hose openings 44. The hose retainer 30 can only be flushly assembled against the valve body 26 when the projection 96 on the hose retainer 30 is inserted into the opening 98 in the valve body 26.

Further, the valve body 26 and the mounting tube 36 include interfacing structure that ensures the valve body 26 is properly oriented in the mounting tube 36. In one embodiment, the valve body 26 includes structure near the second end 40 and the mounting tube 36 includes structure around the opening 54 in the first end 50 that ensure the valve body 26 is properly aligned with the mounting tube 36 (which will also ensure that the projection 96 on the hose retainer 30 is inserted into the opening 98 in the valve body 26 so that the hose retainer 30 will be flushly assembled against the valve body 26). In the embodiment shown in FIGS. 3A-3H, the structure on the valve body 26 includes three generally trapezoidal shaped projections 100 around a circumference near the second end 40 of the valve body 26. In the embodiment shown in FIGS. 4A-4E, the structure in the mounting tube 36 includes three generally trapezoidal shaped notches 102 around a circumference of the opening 54 in the first end 50 of the mounting tube 36. The valve body 26 can only be properly oriented in the mounting tube 36 when the projections 100 on the valve body 26 are inserted into the notches 102 in the mounting tube 36.

Another feature of the faucet 10 ensures that the valve body 26 and the mounting tube 36 are securely assembled together. These components each include structure to ensure the secure assembly. The structure on each component will be described in greater detail below.

Figure 6A:
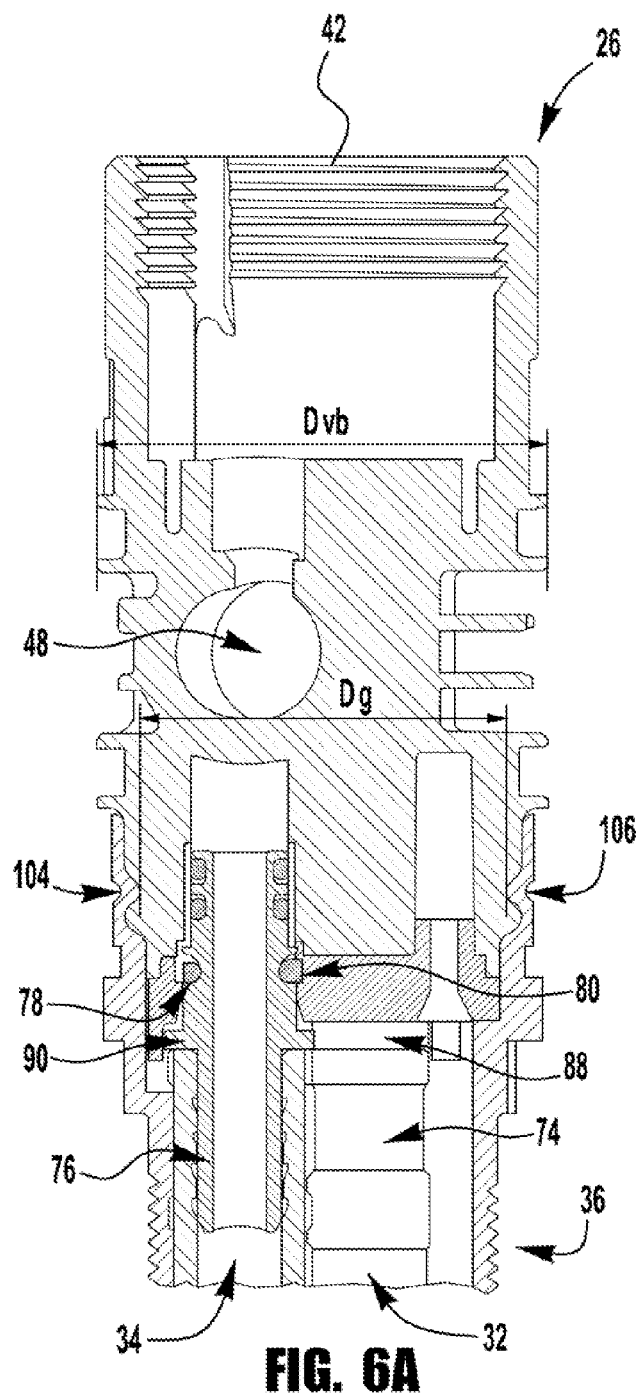
FIGS. 6A-6B are views of a portion of the assembled faucet of FIG. 1
Figure 6B:
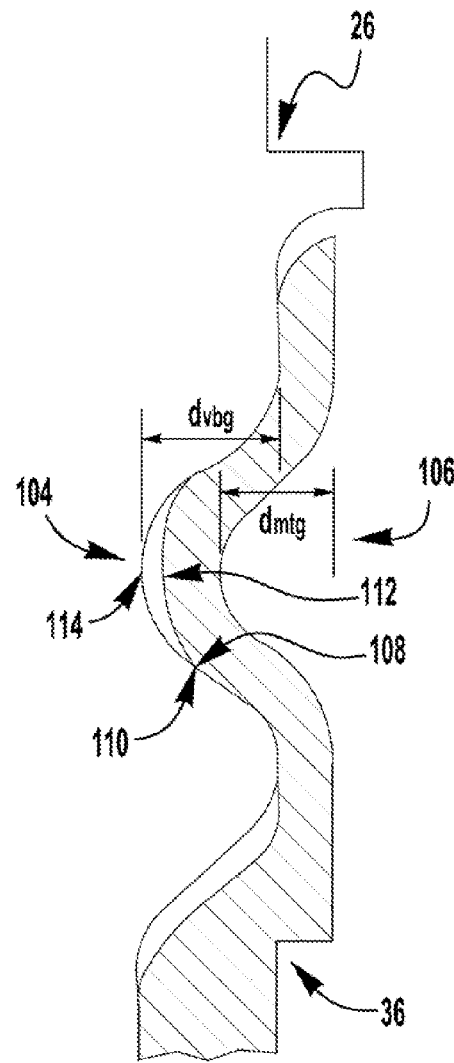

The valve body 26 and the mounting tube 36 include interfacing structure that ensures the valve body 26 is securely assembled in the mounting tube 36. In the embodiment shown in FIGS. 6A-B, the valve body 26 includes a circumferential groove 104 near the second end 40 of the valve body 26. The valve body groove 104 has a diameter $D_g$ and the valve body 26 has an overall outer diameter $D_{vb}$. In one embodiment, $D_g$ is at least seventy-five percent of $D_{vb}$.

After the second end 40 of the valve body 26 is inserted into the opening 54 in the first end 50 of the mounting tube 36, a portion of the mounting tube 36 outwardly adjacent to the valve body groove 104 is deformed into the valve body groove 104 forming a circumferential groove 106 near the first end 50 of the mounting tube 36. In one embodiment, the mounting tube groove 106 is deformed into the valve body groove 104 over a generously radiused, serpentine profile. In one embodiment, the mounting tube groove 106 is formed using a cold forming process. Exemplary cold forming processes include roll forming, crimping, stamping, and magnetic metal forming. However, one of ordinary skill in the art will appreciate that other groove forming processes could be used to form the mounting tube groove 106. Groove forming processes are well-known in the art and, therefore, will not be described in greater detail.

The mounting tube groove 106 has a depth $d_{mtg}$ and the valve body groove 104 has a depth $d_{vbg}$. In one embodiment, $d_{mtg}$ is between fifty percent and ninety-five percent of $d_{vbg}$. Additionally, in the embodiment shown in FIG. 6B, sides 108 of the mounting tube groove 106 contact sides 110 of the valve body groove 104, but a bottom 112 of the mounting tube groove 106 does not contact a bottom 114 of the valve body groove 104. In one embodiment, between fifty percent and ninety-five percent of the valve body groove 104 is contacted by the mounting tube groove 106.

Using the features of the faucet 10 described above, components of the faucet 10 can be properly and securely assembled together. The assembly steps will be described in greater detail below. The structure of the components that ensures the components will be properly and securely assembled together will not be described in detail below as this structure has been described in detail above.

The supply hoses 32 and the outlet hose 34 are inserted through the mounting tube 36 so that the first ends 66 of the supply hoses 32 and the first end 70 of the outlet hose 34 extend out the first end 50 of the mounting tube 36 and the second ends 68 of the supply hoses 32 and the second end 72 of the outlet hose 34 extend out the second end 52 of the mounting tube 36. The first end 70 of the outlet hose 34 is inserted into the outlet hose opening 64 in the hose retainer 30 so that the first end 70 of the outlet hose 34 extends out the first side 58 of the hose retainer 30 and the second end 72 of the outlet hose 34 extends out the second side 60 of the hose retainer 30. After the outlet hose 34 is connected to the hose retainer 30, the first ends 66 of the supply hoses 32 are inserted into the supply hose openings 62 in the hose retainer 30 so that the first ends 66 of the supply hoses 32 extend out the first side 58 of the hose retainer 30 and the second ends 68 of the supply hoses 32 extend out the second side 60 of the hose retainer 30. The first end 70 of the outlet hose 34 and the first ends 66 of the supply hoses 32 are now maintained in the outlet hose opening 64 and the supply hose openings 62 by the retainer clips 80.

The hose retainer 30 (with the supply hoses 32 and the outlet hose 34 connected thereto) is inserted into the mounting tube 36 with the central portion 92 of the projection 84 on the hose retainer 30 inserted into the recess 94 inside the mounting tube 36. The valve body 26 is inserted into the mounting tube 36 with the projections 100 on the valve body 26 inserted into the notches 102 in the mounting tube 36. When the valve body 26 is properly inserted into the mounting tube 36, the projection 96 on the hose retainer 30 will be inserted into the opening 98 in the valve body 26. The portion of the mounting tube 36 outwardly adjacent to the valve body groove 104 is deformed into the valve body groove 104 fowling the mounting tube groove 106. The valve body 26, the hose retainer 30, the supply hoses 32, the outlet hose 34, and the mounting tube 36 are now properly and securely assembled together. The steps required to assemble the other components of the faucet 10 will not be described.

The specific structure of the valve body 26, the hose retainer 30, the supply hoses 32, the outlet hose 34, and the mounting tube 36 in various embodiments has been described and shown in detail above and in the Figures. The structure of these components ensures that the components are properly and securely assembled together. However, one of ordinary skill in the art will appreciate that the structure of these components could take many other forms. For example, where the structure includes a projection on a first component that interfaces with an opening in a second component, the projection could be on the second component and the opening in the first component. Similarly, where the structure includes a projection of a particular shape and size and an opening of a corresponding shape and size, the projection and opening could be of any mating shape and size. Likewise, where the structure includes a projection and an opening, the structure could include mating surfaces that do not include a defined projection and opening.

One of ordinary skill in the art will now appreciate that the present invention provides a faucet including structure to ensure components of the faucet are properly and securely assembled together. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. A faucet, comprising:
   a valve body operable to receive at least a portion of a cartridge assembly and to connect to at least two hoses, the valve body having a first end and a second end, the first end including an opening, the second end including at least two hose openings;
   a mounting tube operable to mount the faucet to a surface, to receive at least a portion of the valve body, and to connect to at least two hoses, the mounting tube having a first end and a second end, the mounting tube including an opening extending from the first end through the second end; and
   a hose retainer operable to interface between the valve body and the mounting tube and to connect to at least two hoses, the hose retainer having a first side and a second side, the hose retainer including at least two hose openings extending therethrough from the first side to the second side;
   wherein the valve body, the mounting tube, the hose retainer, and the hoses include structure to ensure that the valve body, the mounting tube, the hose retainer, and the hoses are properly assembled together;
   wherein the valve body includes a circumferential groove near the second end of the valve body; and
   wherein the mounting tube includes a circumferential groove near the first end of the mounting tube, the mounting tube groove being formed by inserting the second end of the valve body into the opening in the first end of the mounting tube and deforming a portion of the mounting tube outwardly adjacent to the valve body groove into the valve body groove.

2. The faucet of claim 1, wherein the valve body groove has a diameter $D_g$, the valve body has an overall outer diameter $D_{vb}$, and $D_g$ is at least seventy-five percent of $D_{vb}$.

3. The faucet of claim 1, wherein the mounting tube groove has a depth $d_{mtg}$, the valve body groove has a depth $d_{vbg}$, and $d_{mtg}$ is between fifty percent and ninety-five percent of $d_{vbg}$.

4. The faucet of claim 1, wherein sides of the mounting tube groove contact sides of the valve body groove and a bottom of the mounting tube groove does not contact a bottom of the valve body groove.

5. The faucet of claim 1, wherein between fifty percent and ninety-five percent of the valve body groove is contacted by the mounting tube groove.

6. The faucet of claim 1, wherein the hose retainer includes structure around the hose openings in the hose retainer and the hoses include structure around connectors on the hoses.

7. The faucet of claim 6, wherein the hose retainer structure includes a plurality of projections and the hose structure includes a flange.

8. The faucet of claim 1, wherein the hose retainer includes structure on the second side of the hose retainer and the mounting tube includes structure inside the opening in the first end of the mounting tube.

9. The faucet of claim 8, wherein the hose retainer structure includes a projection and the mounting tube structure includes a recess.

10. The faucet of claim 1, wherein the hose retainer includes structure on the first side of the hose retainer and the valve body includes structure in the second end of the valve body.

11. The faucet of claim 10, wherein the hose retainer structure includes a projection and the valve body structure includes an opening.

12. A faucet, comprising:
    a valve body operable to receive at least a portion of a cartridge assembly and to connect to at least two hoses, the valve body having a first end and a second end, the first end including an opening, the second end including at least two hose openings, the valve body being primarily non-metal; and
    a mounting tube operable to mount the faucet to a surface, to receive at least a portion of the valve body, and to connect to at least two hoses, the mounting tube having a first end and a second end, the mounting tube including an opening extending from the first end through the second end, the mounting tube being primarily metal;
    wherein the valve body includes a circumferential groove near the second end of the valve body; and
    wherein the mounting tube includes a circumferential groove near the first end of the mounting tube, the mounting tube groove being formed by inserting the second end of the valve body into the opening in the first end of the mounting tube and deforming a portion of the mounting tube outwardly adjacent to the valve body groove into the valve body groove.

13. The faucet of claim 12, wherein the valve body groove has a diameter $D_g$, the valve body has an overall outer diameter $D_{vb}$, and $D_g$ is at least seventy-five percent of $D_{vb}$.

14. The faucet of claim 12, wherein the mounting tube groove has a depth $d_{mtg}$, the valve body groove has a depth $d_{vbg}$, and $d_{mtg}$ is between fifty percent and ninety-five percent of $d_{vbg}$.

15. The faucet of claim 12, wherein sides of the mounting tube groove contact sides of the valve body groove and a bottom of the mounting tube groove does not contact a bottom of the valve body groove.

16. The faucet of claim 12, wherein between fifty percent and ninety-five percent of the valve body groove is contacted by the mounting tube groove.

17. A faucet, comprising:
    a valve body operable to receive at least a portion of a cartridge assembly and to connect to at least two hoses, the valve body having a first end and a second end, the first end including an opening, the second end including at least two hose openings;
    a mounting tube operable to mount the faucet to a surface, to receive at least a portion of the valve body, and to connect to at least two hoses, the mounting tube having a first end and a second end, the mounting tube including an opening extending from the first end through the second end; and a hose retainer operable to interface between the valve body and the mounting tube and to connect to at least two hoses, the hose retainer having a first side and a second side, the hose retainer including at least two hose openings extending therethrough from the first side to the second side;

wherein the valve body, the mounting tube, the hose retainer, and the hoses include structure to ensure that the valve body, the mounting tube, the hose retainer, and the hoses are properly assembled together.

18. The faucet of claim 17, wherein the hose retainer includes structure around the hose openings in the hose retainer and the hoses include structure around connectors on the hoses.

19. The faucet of claim 17, wherein the hose retainer includes structure on the second side of the hose retainer and the mounting tube includes structure inside the opening in the first end of the mounting tube.

20. The faucet of claim 17, wherein the hose retainer includes structure on the first side of the hose retainer and the valve body includes structure in the second end of the valve body.

* * * * *